United States Patent
Hiraoka et al.

(10) Patent No.: US 6,788,008 B2
(45) Date of Patent: Sep. 7, 2004

(54) DEVICE FOR OPERATING A DIELECTRIC BARRIER DISCHARGE LAMP

(75) Inventors: Takahiro Hiraoka, Himeji (JP); Masashi Okamoto, Akashi (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 58 days.

(21) Appl. No.: 10/153,815

(22) Filed: May 24, 2002

(65) Prior Publication Data

US 2002/0180381 A1 Dec. 5, 2002

(30) Foreign Application Priority Data

May 25, 2001 (JP) ........................................ 2001-157077

(51) Int. Cl.$^7$ .............................................. H05B 41/24
(52) U.S. Cl. ........................ 315/276; 315/207; 315/219; 315/291
(58) Field of Search ................................ 315/276, 282, 315/287, 57, 56, 219, 70, 209 R, 212, 291, 307, 224; H05B 41/24

(56) References Cited

U.S. PATENT DOCUMENTS

| | | | |
|---|---|---|---|
| 4,983,881 A | 1/1991 | Eliasson et al. | ............ 313/607 |
| 5,977,722 A | * 11/1999 | Yokokawa et al. | .......... 315/207 |
| 6,239,559 B1 | 5/2001 | Okamoto et al. | ............ 315/307 |
| 6,356,033 B1 | * 3/2002 | Okamoto et al. | ....... 315/209 R |
| 6,369,519 B1 | * 4/2002 | Okamoto et al. | ............ 315/224 |

FOREIGN PATENT DOCUMENTS

| | | | |
|---|---|---|---|
| EP | 0 817 542 A1 | 1/1998 | |
| EP | 0 975 204 A1 | 1/2000 | |
| EP | 1 001 661 A1 | 5/2000 | |
| EP | 1 263 266 A1 | * 4/2002 | .......... H05B/41/28 |
| JP | 11-317203 | 11/1999 | |

OTHER PUBLICATIONS

Discharge Handbook, Jun. 1989, Revised New Edition Issued by the Institute of Electrical Engineers of Japan, Seventh Printing, pp. 263–271.

* cited by examiner

Primary Examiner—Wilson Lee
Assistant Examiner—Trinh Vo Dinh
(74) Attorney, Agent, or Firm—Nixon Peabody LLP; David S. Safran

(57) ABSTRACT

A device for operating a dielectric barrier discharge lamp in which not only the efficiency is maintained, but in which a reduction of the irradiance over the course of use is advantageously prevented. The device includes a dielectric barrier discharge lamp and a feed device for applying a high voltage to this dielectric barrier discharge lamp, wherein the feed device via a set-up transformer applies a high voltage with an essentially periodic waveform to the barrier discharge lamp. Moreover, the applied high voltage first produces a steep rising waveform and then ringing, wherein the ratio of the difference between a second extreme value point and a third extreme value point to the difference between a first extreme value point and the second extreme value point of the ringing is less than or equal to 30%. It is a further object of an embodiment of the present invention to reduce or eliminate the ringing.

2 Claims, 5 Drawing Sheets

DEVICE FOR OPERATING A DIELECTRIC BARRIER DISCHARGE LAMP

BACKGROUND OF THE INVENTION

1. Field of the Invention

The invention relates to device for operating a dielectric barrier discharge lamp. More particularly, the invention relates to an image scanning device with a light source that is a fluorescent lamp using a dielectric barrier discharge.

2. Description of the Prior Art

As an example of technical literature relating to dielectric-barrier discharge lamp, JP patent disclosure document HEI 2-7353 (U.S. Pat. No. 4,983,881) discloses a radiator device, i.e. a dielectric barrier discharge lamp in which a discharge vessel is filled with a discharge gas and in which a dielectric barrier discharge forms excimer molecules, from which light is emitted. This dielectric barrier discharge is also called an ozone production discharge or a silent discharge, as is described in the *Discharge Handbook*, Denki Gakkai, June 1989, 7th edition, page 263.

Since this dielectric barrier discharge lamp has various features which a conventional low pressure mercury lamp or a conventional high pressure arc discharge lamp does not have, there are diverse possible applications. Especially in view of the great interest in the problem of photochemical environmental pollution, recently much interest has been shown in this photochemical reaction by UV radiation.

FIG. 1 schematically shows an arrangement which explains the working principle of a dielectric barrier discharge lamp. In the figure, reference number 2 indicates a dielectric barrier discharge lamp having one dielectric or two dielectrics (6,7) between electrodes (4, 5) and which surround a discharge plasma space (3). In FIG. 1, a lamp bulb (8) functions as the dielectric (6, 7).

In the operation of the dielectric barrier discharge lamp 2, an ac voltage of 2 kV to 10 kV with a high frequency of, for example, 10 kHz to 200 kHz is applied to the electrodes (4, 5) at its two poles by a feed device 1 and an associated feed line 11. Due to the dielectrics (6,7) between the discharge plasma space 3 and the electrodes (4, 5), current does not flow from the electrodes (4, 5) directly into the discharge plasma space 3, but rather the current flows by means of the action of the dielectrics (6,7) which acts as a capacitor. This means that, on the surfaces of the dielectrics (6,7) and on the side of the discharge plasma space 3, an equivalent electrical charge is induced by polarization of the dielectric by the respective electrode (4,5). However, the induced electrical charge on the dielectrics has the opposite polarity than that of the electrodes. Between the surfaces of the dielectrics (6,7), which are located opposite to one another and surrounding the discharge plasma space 3, a discharge takes place.

Since only little current flows along the surfaces of the dielectrics (6, 7) on the side of the discharge plasma space 3 where the discharge takes place, the electrical charge induced on the surfaces of the dielectric (6,7) on the side of the discharge plasma space 3 is neutralized by the electrical charge moving through the discharge. Therefore, the electrical field of the discharge plasma space 3 is reduced. The discharge current soon stops even if the application of the voltage to the electrodes (4, 5) is continued to be applied. However, in the case in which the voltage applied to the electrodes (4, 5) continues and increases, the discharge current remains uninterrupted.

In the case in which the discharge stops after a discharge has occurred once, a discharge does not occur again until the polarity of the voltage applied to the electrodes (4, 5) is reversed.

In the case of, for example, a dielectric barrier discharge lamp is filled with xenon gas, the xenon gas is split by the discharge into ions and electrons, yielding a xenon plasma. In this xenon plasma, when excited to a certain energy level, forms excimer molecules. The xenon excimers dissociate after a certain lifetime, and the energy released in the process is emitted in the form of photons with vacuum UV wavelengths. It is desirable to form these excimer molecules with high efficiency so that the dielectric barrier discharge lamp can be operated as vacuum UV light source with high efficiency.

The greatest obstacle to efficient formation of excimer molecules during discharge is the excitation of the discharge plasma to energy levels that do not contribute to the formation of excimer molecules.

Electron movement of the discharge plasma immediately after starting the discharge takes place in groups when the energy is high but the temperature is low. In this state there is a great probability that the discharge plasma transitions into the resonant state that is necessary for formation of the excimer molecules. When the discharge interval is prolonged, electron movement of the plasma however gradually transitions into a thermal state, i.e. into the state of thermal equilibrium called the "Maxwell-Boltzman distribution". Thus, the plasma temperature rises and the probability of transition into a more highly excited state becomes greater where excimer molecules cannot be formed.

Moreover, sometimes when excimer molecules have been formed, a subsequent discharge will break down the excimer molecules before their lifespan elapses and they decompose naturally by emitting the desired photon. In fact, in the case of xenon excimers, a period of about 1 microsecond is necessary between the beginning of discharge and emission of a vacuum ultraviolet photon, and a subsequent discharge and repeated discharge in this time interval reduce the efficiency of the excimer emission. Therefore, it becomes apparent that it is most important to reduce the energy of the subsequent discharge as much as possible once the dielectric barrier discharge lamp has started.

The voltage applied to the dielectric barrier discharge lamp is not a sinusoidal voltage. However, a voltage which has a steep change is suitable. To improve the efficiency of the dielectric barrier discharge lamp, based on these understandings, the technique in which a more or less rectangular voltage waveform is applied is described, for example, in Japanese patent disclosure document HEI 11-317203 (U.S. patent application Ser. No. 09/555,512, now U.S. Pat. No. 6,369,519). This publication discloses that together with applying a voltage with a steep rise the time for suppressing a subsequent ringing is shortened.

This technique meets the above described precondition in which it is important to reduce the energy of the subsequent discharge as much as possible once the dielectric barrier discharge is started so as to achieve an outstanding effect with respect to efficiency of the formation of excimer molecules.

The above described dielectric barrier discharge lamp is an outstanding arrangement with respect to efficiency. However, it has been considered to be disadvantageous in that the irradiance of the dielectric barrier discharge lamp drops over the course of use.

Especially in the case of using this dielectric barrier discharge lamp as a fluorescent light source of an image scanning device, the sensitivity of the CCD sensor as an image scanning element drops over time when the irradiance decreases. This results in the extremely serious defect in which imaging using the dielectric barrier discharge lamp as a light source is not possible. Furthermore, the phenomenon in which the irradiance decreases over the course of use is undesirable, not only in a light source for an image scanning device but in similar devices that require constant light level output. Besides the conventional technical object of increasing the efficiency, there is therefore a great demand for achieving the new object of maintaining the irradiance, i.e. preventing a reduction in irradiance. The technique in which a dielectric barrier discharge lamp is used as a light source of the above described image scanning device is described in commonly-owned, co-pending U.S. patent application Ser. No. 10/014,453 which is hereby incorporated by reference.

SUMMARY OF THE INVENTION

An object of the present invention is to devise a device for operating a dielectric barrier discharge lamp in which not only the efficiency is maintained, but in which a reduction of the irradiance over the course of use is advantageously prevented.

A device for operating a dielectric barrier discharge lamp of the present invention comprises a dielectric barrier discharge lamp and a feed device for applying a high voltage to this dielectric barrier discharge lamp, wherein this feed device via a set-up transformer applies a high voltage with an essentially periodic waveform to the above described barrier discharge lamp. Further, when the voltage polarity changes for the subsequent dielectric barrier discharge after completion of a preceding dielectric barrier discharge, the waveform of this applied voltage first produces a steep rising waveform and, in the subsequent ringing, the ratio of the difference between a second extreme value point and a third extreme value point to the difference between the first extreme value point and a second extreme value point is less than or equal to 30%.

The object of the invention is achieved is in the arrangement illustratively shown in FIG. 2 wherein the above described ringing is essentially not present. After thoughtful consideration of the above described object of the invention, it was found that the reason for the reduction of the irradiance of a dielectric barrier discharge lamp (hereinafter also called only a "discharge lamp") over the course of use is the temperature increase of the discharge gas. This temperature increase is formed by a periodic voltage being continuously applied, and, as a result, it becomes accumulative. It is believed that due to this temperature increase, the formation of excimer molecules within the discharge vessel does not take place with high efficiency. Furthermore, this temperature increase is caused by an oscillation voltage waveform which forms after applying the voltage with a steeply rising waveform to the discharge lamp. The time determination of the oscillation disclosed in the above described Japanese patent disclosure document 11-317203 in and of itself is not sufficient, but it was found that the magnitude of the oscillation in itself (i.e., amplitude) must be fixed. Specifically, it is effective to prevent a reduction of the irradiance in an oscillating voltage waveform that is formed after applying the voltage waveform with a steep rise for producing a dielectric barrier discharge. It is preferable to make this amplitude as small as possible, so as to not allow the ringing or oscillation to arise.

The invention is described below using several embodiments shown in the drawings.

DETAILED DESCRIPTION OF THE INVENTION

Figure 1:
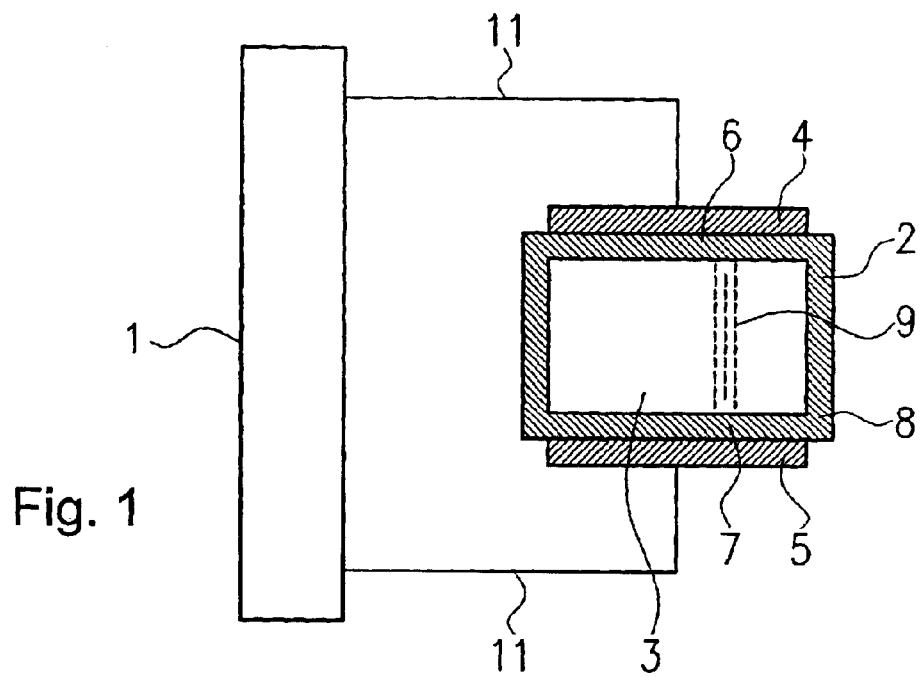
FIG. 1 shows a schematic of the concepts of a dielectric barrier discharge lamp.
Figure 2:
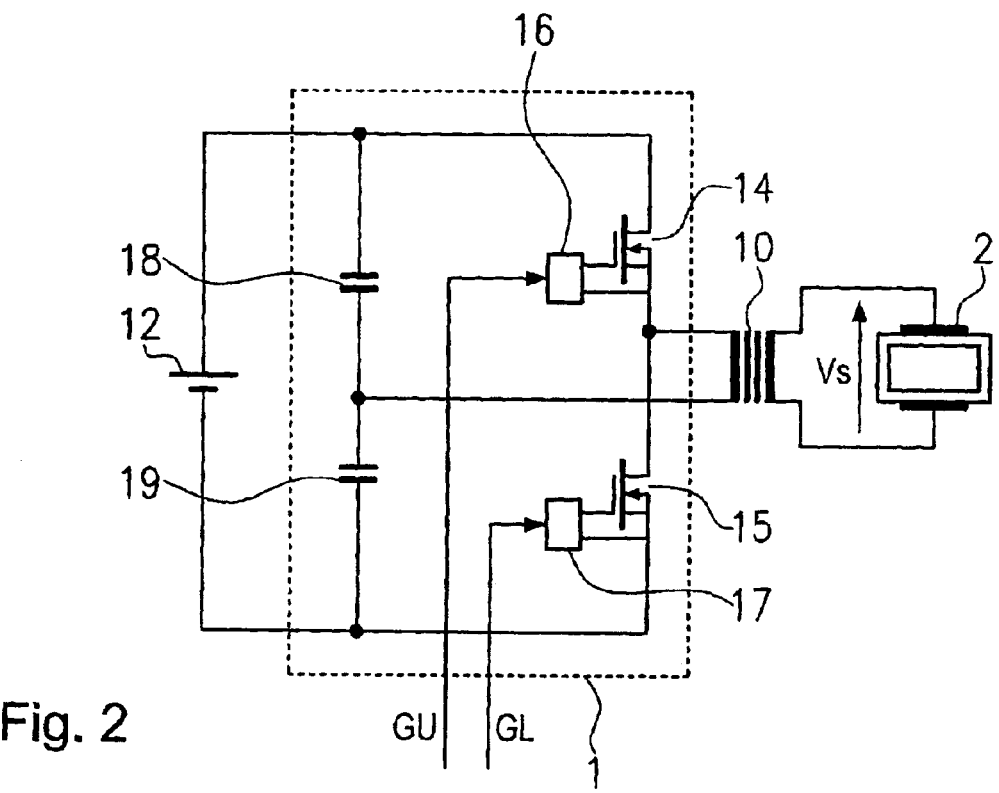
FIG. 2 shows a schematic of a device as in accordance with the invention for operating a dielectric barrier discharge lamp.

An embodiment of a device for operating a dielectric barrier discharge lamp is described below. First, the arrangement of the entire luminous operation device is described. FIG. 2 schematically shows a device for operating a dielectric barrier discharge lamp which includes a feed device 1 and a dielectric barrier discharge lamp 2. FIG. 2 shows the feed device 1 having an inverter circuit in. The illustration shows a simplified circuit diagram of an inverter circuit using a half bridge system. The power of the dc source 12 is converted into an alternating power and applied via capacitors (18, 19) and switching devices (14, 15), which are a FET or the like, to the primary side of a set-up transformer 10, which converts it into a high ac voltage applied to the dielectric barrier discharge lamp 2. Inverter gate driver circuits (16, 17) are connected to the respective switching devices (14, 15) of the inverter circuit. Turning the respective switching devices (14, 15), the on and off state of the switching devices (14, 15) is controlled according to gate signals (GU, GL).

Figure 3:
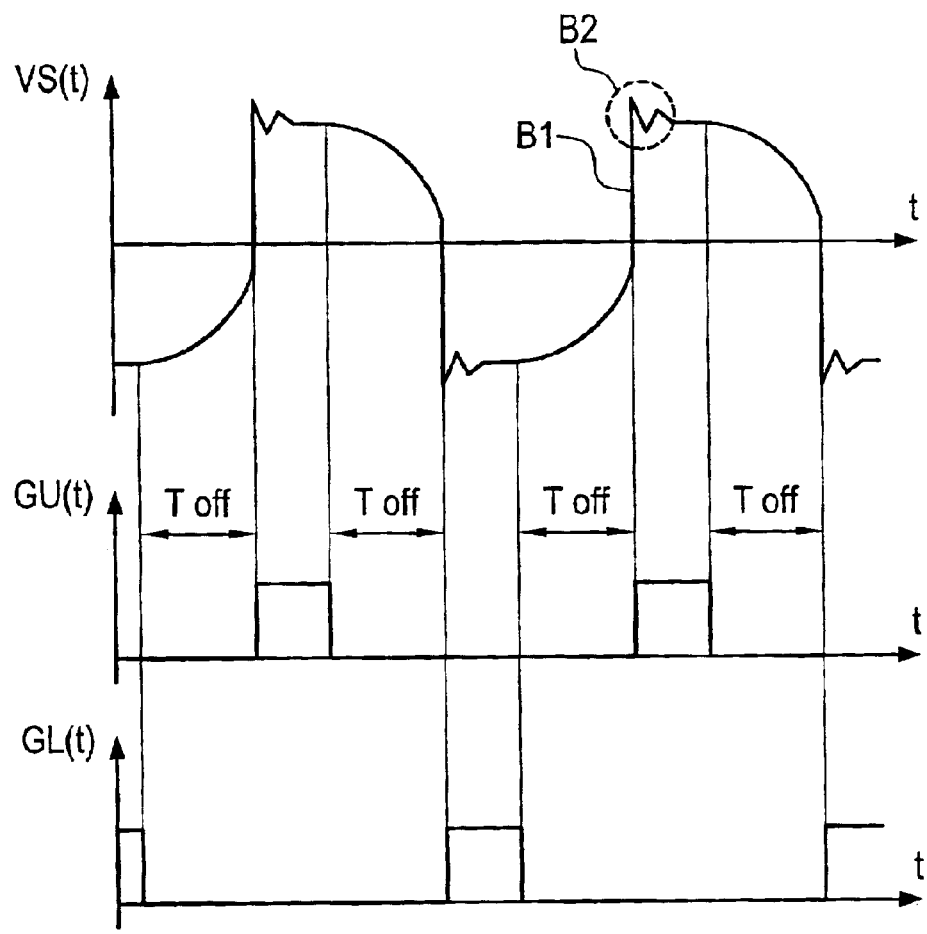
FIG. 3 shows a schematic of the voltage waveform of a dielectric barrier discharge lamp in a embodiment of the invention.

FIG. 3 schematically shows the relation between the gate signals (GU, GL) and the waveform Vs (t) of a voltage applied to a lamp. When the gate signals (GU, GL) are at a low level, the switching devices (14, 15) to which they are connected are turned off. When the gate signals (GU, GL) are at a high level, the switching devices (14, 15) to which they are connected are turned on. The dielectric barrier discharge lamp is controlled in this way at one time by turning the switching devices on and off, which generates an essentially periodic waveform with a steep rise B1 and a subsequent ringing B2.

Figure 4:
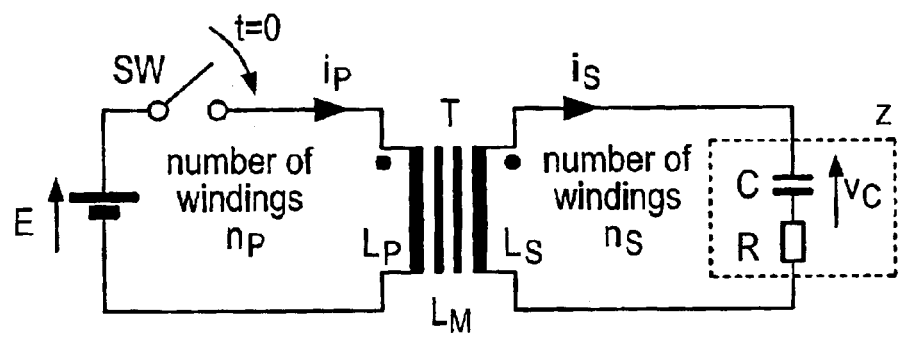
FIG. 4 shows a schematic of an embodiment of the invention using a resistor-capacitor model.

The voltage waveform desired in the lamp operating device of the invention should not have the ringing B2 after the steep rising B1. The discharge lamp should be controlled as much as possible to minimize such a voltage waveform. This desired objective is described using the circuit model in FIG. 4. Since a dielectric barrier discharge lamp the discharge gas can be called the resistor and the dielectrics can be called capacitors, it can be seen that a resistor and a capacitor are series-connected in succession, as is shown in FIG. 4. Using this model, a case is described in which this can be expressed on the secondary side of a transformer, and in which at the same time a stepping voltage is applied to the primary side.

First, the following expression is derived:

$$L_M^2 = k^2 LpLs,$$

Then, when N (np/ns) is the winding number ratio of the secondary winding to the primary winding of a transformer T, E is the dc voltage source, R is the load resistor, C is the electrostatic capacity of the load capacitor, Lp is the inductance on the primary side, Ls is the inductance on the secondary side, $L_M$ is a mutual inductance, k is the coupling coefficient between the primary winding and the secondary winding of the transformer T, and F is the leak inductance, with consideration of the leak inductance F, the following is derived:

$$F = (LpLs - L_M^2)/Lp \text{ or } F = (1-k^2)Ls$$

Furthermore, if the response of the circuit in the case of closing a switch SW of the primary side at a time t from 0 is analyzed, the current $i_s(t)$ on the secondary side is normally the oscillation solution shown using formula 1 as follows:

$$i_s(t) = \frac{EN}{R} \frac{1}{\sqrt{\frac{F}{CR^2} - \frac{1}{4}}} \exp\left(-\frac{R}{2F}t\right) \sin\left(\frac{R}{F}\sqrt{\frac{F}{CR^2} - \frac{1}{4}}\, t\right) \quad \text{(Formula 1)}$$

When the value within the square root sign of the sine-area in Formula 1 is less than 0, ringing disappears, while ringing is formed when the above described value is greater than 0. This condition can normally be expressed as a condition of Formula 2.

$$F/CR^2 < \tfrac{1}{4} \quad \text{Formula 2}$$

If the phenomenon of the voltage waveform which forms on the secondary side of the transformer T is analyzed, by combination of the values of the resistor, the electrostatic capacity of the capacitor and the leak inductance of the transformer with one another in a suitable manner, adjustment can be made so as to achieve no ringing.

Using Formula 1, the oscillation of the current waveform is described. The presence or absence of the oscillation of a current waveform, however, corresponds to the presence or absence of the oscillation of a voltage waveform.

Figure 5:
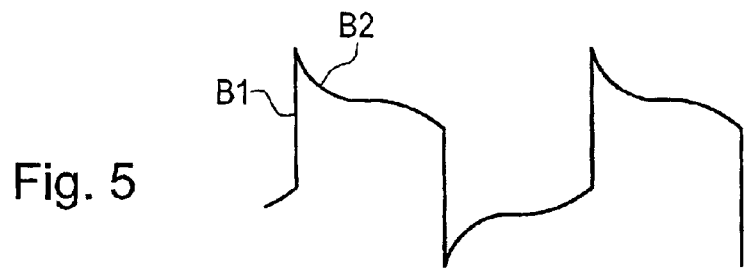
FIG. 5 shows a schematic of a first embodiment of the voltage waveform of a dielectric barrier discharge lamp of the present invention.

FIG. 5 shows a most desirable form of the voltage waveform of the voltage waveforms that can be produced by the above-described concept of circuit parameters, specifically the one which does not have ringing. This waveform can be achieved by satisfying the ratio shown using Formula 2, i.e. which is translated into practice by a using suitable combination of electrostatic capacity which is formed by the dielectrics and the electrodes of the dielectric barrier discharge lamp, the composition and the pressure of the discharge gas of the lamp and the arrangement of the set-up transformer with one another, more specifically by increasing the resistance of the discharge plasma or by reducing the leak inductance which is viewed from the secondary side of the transformer.

The above described analysis is further described below.

In the circuit shown in FIG. 2, by changing the winding of the set-up transformer 10 and the pressure of the added gas in the discharge lamp 2, the state of the voltage waveform of the discharge lamp 2, especially the state of ringing after steeply rising, is observed. For the discharge lamp 2, xenon was used as the filler gas, and the added a mount having been 19.3 kPa. A test was run in four cases of 24 turns of the primary winding and 240 turns, 288 turns, 381 turns and 420 turns of the secondary winding of the set-up transformer 10.

Figure 6A:
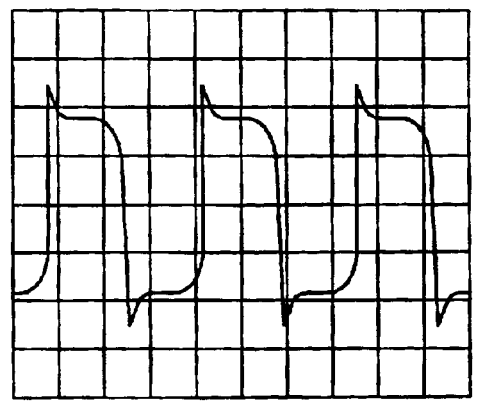
FIGS. 6(*a*) to 6(*d*) each shows a schematic of the test results with respect to the ringing of a device for operating a dielectric barrier discharge lamp.
Figure 6B:
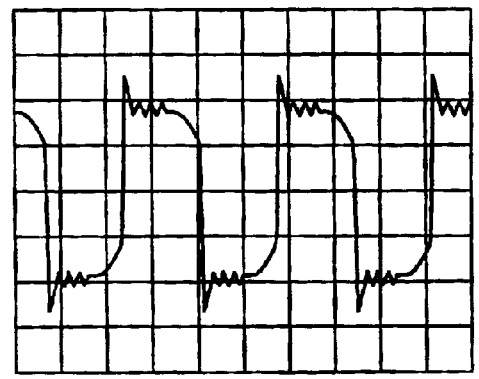
Figure 6C:
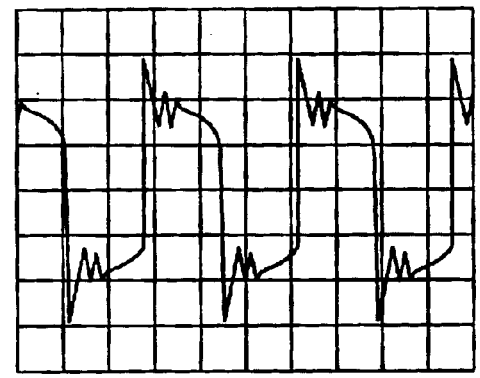
Figure 6D:
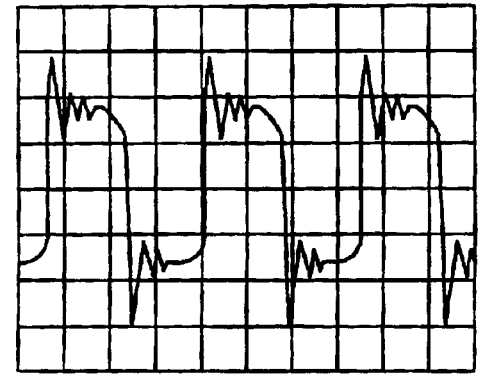

FIGS. 6(a) to 6(d) each shows the above-described four voltage waveforms. More particularly, FIG. 6(a) shows the voltage waveform in the case of 240 turns of the secondary winding. FIG. 6(b) shows the voltage waveform in the case of 288 turns of the secondary winding. FIG. 6(c) shows the voltage waveform in the case of 381 turns of the secondary winding. FIG. 6(d) shows the voltage waveform in the case of 420 turns of the secondary winding. In the figures, the y-axis plots the voltage value and the x-axis plots the time, the y-axis being 500 V/div and the x-axis 5 microseconds/div.

Figure 7:
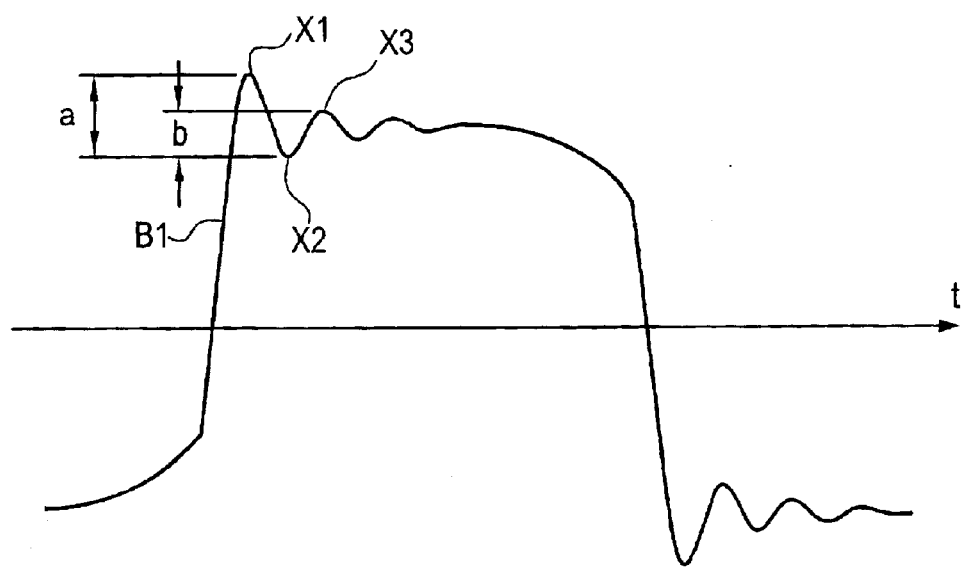
FIG. 7 shows a schematic of a second embodiment of the voltage waveform of a dielectric barrier discharge lamp and the ringing.

At this point, the definition of the magnitude of the oscillation is described. As shown in FIG. 7, the oscillation in voltage ringing which overshoots the steep rising Bi is attenuated by its changing from the first extreme value point (X1) to a second extreme value point (X2) to a third extreme value point (X3). Here the ratio of the difference (b) between the second extreme value point (X2) and the third extreme value point (X3) to the difference (a) between the first extreme value point (X1) and the second extreme value point (X2) (b/a: hereafter this ratio is advantageously called the "ringing ratio") is called the magnitude of the oscillation. The first extreme value point (X1) and the third extreme value point (X3) are maximum points, while the second extreme value point (X2) is the minimum point. As is shown in FIG. 3, however, in a voltage waveform with inverted polarity of the voltage applied to the discharge lamp 2 of course the first extreme value point (X1) and the third extreme value point (X3) becomes the minimum point and the second extreme value point (X2) becomes the maximum point. As is apparent from FIG. 7, these extreme values are the maximum or minimum values of the illustrated wave form at which the wave form changes direction.

In the test results shown in FIG. 6(a) to FIG. 6(d), in FIG. 6(a) a ringing ratio in the voltage waveform of 11.9%, in FIG. 6(b) a ringing ratio in the voltage waveform of 28.8%, in FIG. 6(c) a ringing ratio in the voltage waveform of 46.6%, and in FIG. 6(d) a ringing ratio in the voltage waveform of 55.3% were measured. FIGS. 6(a)–6(d) show that the ringing ratio increases according to the change of the winding number of the secondary winding.

This test shows that changing the inductance of the secondary side of the set-up transformer has a great effect on the voltage waveform of the discharge lamp, and that specifically ringing decreases more as the inductance becomes smaller.

Next, in a primary winding of 24 turns and a secondary winding of 288 turns of the set-up transformer, the discharge lamp is filled with 21.3 kPa xenon gas as the filler gas. This means that the pressure of the added gas has been increased in the same transformer (with the same winding number) as in the above described test of 6(b).

Figure 8:
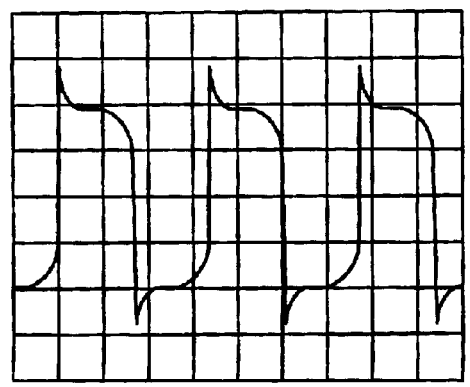
FIG. 8 shows a schematic of the experimental result with respect to the ringing of a device for operating a dielectric barrier discharge lamp.

FIG. 8 shows this discharge lamp and the voltage waveform. The ringing ratio in this case is roughly 0%. It becomes apparent that ringing is hardly present anymore. This means that, as it is shown, by changing the pressure of the gas added to the discharge lamp the ringing is influenced even if the transformer has the same specification, i.e original specification of the transformer is not changed.

The time attenuation of the ringing ratio and the irradiance are described below. The degree of reduction of the irradiance of the respective discharge lamp with the ringing ratio determined in the above described test was measured. For the irradiance an attenuation ratio of the illuminance after five minutes of lamp operation to the illuminance at the start of luminous operation is shown.

Figure 9A:
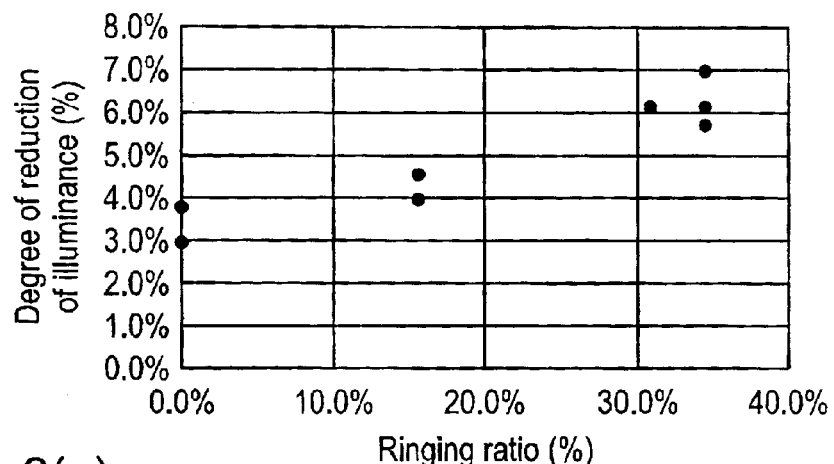
FIGS. 9(*a*) & 9(*b*) each show a schematic of the experimental results with respect to the degree of reduction of the illuminance of a device for operating a dielectric barrier discharge lamp.
Figure 9B:
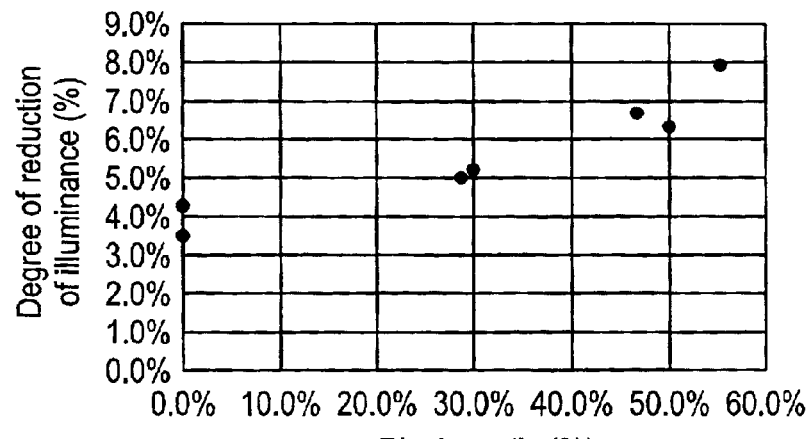

FIG. 9(a) shows the experimental result in the case of adding 19.3 kPa xenon gas. FIG. 9(b) shows the experimental result in the case of adding 21.3 kPa xenon gas. It becomes apparent that the degree of reduction of the illuminance is smaller with the smaller ringing ratio. In particular it is shown that the degree of reduction of the illuminance is less than or equal to 5% when the ringing ratio is less than or equal to 30%.

Application of an excess sinusoidal alternating power, which causes heat generation of the lamp, can be prevented or made as small as possible by the measure of preventing the formation of ringing after a steep rise in voltage in a dielectric barrier discharge lamp. Therefore, a reduction of the excimer efficiency according to heat generation of the lamp can be advantageously prevented.

In this experimental example, the effect of the magnitude of ringing on the irradiance was described. The ringing can be completely eliminated by meeting the condition which is shown above with Formula 3. In the most preferred embodiment of the present invention, heat generation by ringing does not form at all.

Another embodiment of the present invention by which no ringing is produced is described below using the voltage waveform shown in FIG. 7.

When the voltage waveform has reached the first extreme value point (X1), when afterwards the voltage begins to drop, and when the second extreme value point (X2) is reached, a drive may be implemented wherein the switching devices are turned off at the instant of reversal to a repeated rise so as to prevent ringing.

Figure 10:
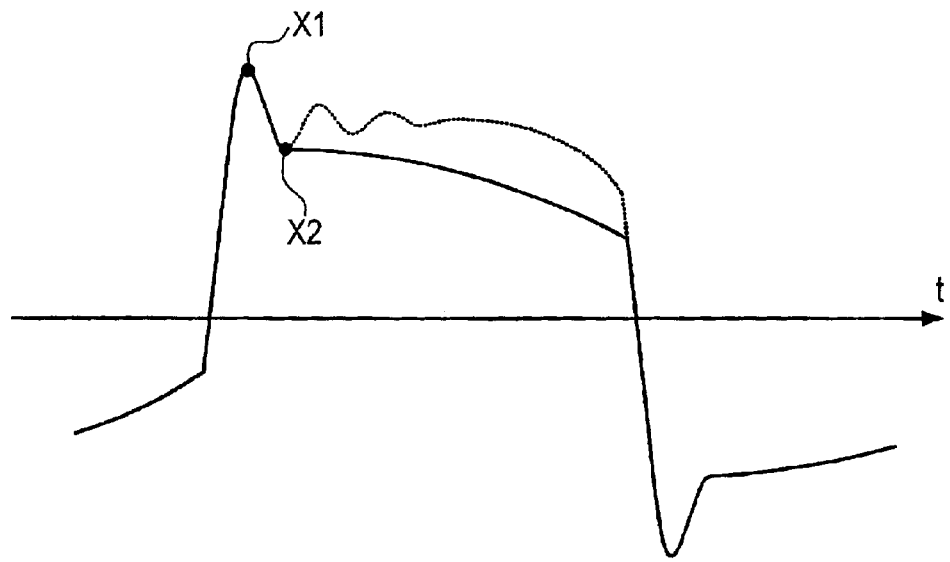
FIG. 10 shows a schematic of a third embodiment of the voltage waveform of a dielectric barrier discharge lamp.

FIG. 10 shows the voltage waveform in the case in which one such drive is implemented. The timing for turning off the switching devices is limited not only to the instant of the second extreme value point (X2), but can relate to a time interval after reaching the first extreme value point (X1) until reaching the second extreme value point (X2). Furthermore, it is possible to set the timing for turning off the switching devices to the extent that there is no effect on the temperature increase of the lamp after the transition of the second extreme value point (X2).

In the device of the invention for operating a dielectric barrier discharge lamp, there are the features in which the feed device via a set-up transformer applies a high voltage with an essentially periodic waveform to the barrier discharge lamp. When the voltage polarity changes for the next dielectric barrier discharge after completion of one dielectric barrier discharge the waveform of this applied voltage is subjected to the change described below:

First, a steep rise is produced. Afterwards ringing is obtained in which the ratio of the difference between the second extreme value point and the third extreme value point to the difference between the first extreme value point and the second extreme value point is less than or equal to 30%. This relates to the fact that in the voltage waveform shown in FIG. 8 the ringing ratio (b/a) is fixed at less than or equal to 30%.

Second, after reaching the first extreme value point (maximum point) after producing a steep rise, the measure is taken and an attenuation curve is plotted without ringing occurring. This is shown in the voltage waveform in FIG. 5.

Third, after reaching the first extreme value point (maximum point) after producing a steep rise in the region before and after reaching the second extreme value point in which the temperature of the lamp does not rise, the switching devices are turned off, thus preventing the formation of ringing. The voltage waveform resulted is shown in FIG. 10, wherein the y-axis plots the voltage value.

In the above described embodiments, the case of using the circuit of a half bridge system was described. However, a circuit of a full bridge system or a circuit of the push-pull type can also be used.

In the invention, a dielectric barrier discharge lamp with a general configuration was described. However, it goes without saying that the invention can also be used for a fluorescent lamp with a configuration in which a fluorescent body is applied to the inside of the discharge vessel.

As described above, in a lamp which emits visible radiation and in a fluorescent lamp that has been applied to the inside of the discharge vessel, a result of the temperature increase of the lamp is the decrease in the efficiency of conversion of visible radiation of the fluorescent body. This decrease in efficiency leads to a reduction in the light intensity of the visible radiation. However, as described above, this defect can also be advantageously eliminated the embodiments described in the invention wherein the ringing is suppressed.

What we claim is:

1. A device for operating a dielectric barrier discharge lamp, comprising a feed device for applying a high voltage to the dielectric barrier discharge lamp, wherein the feed device comprises a set-up transformer adapted to apply a high voltage with a periodic waveform to the barrier discharge lamp, said waveform, at a polarity change after a dielectric barrier discharge, having a steep rising waveform and a subsequent ringing, a first wave form maximum or minimum value, a second wave form maximum or minimum value, and a third wave form maximum or minimum value, and for which a ratio of a first difference between the second wave form maximum or minimum value and the third wave form maximum or minimum value relative to a second difference between the first wave form maximum or minimum value and the second wave form maximum or minimum value is produced that is less than or equal to 30%.

2. Device as claimed in claim 1, wherein said ratio produced results in minimization of said ringing approaching elimination thereof.

* * * * *